D. Roberge,

Horseshoe.

No. 100,329.  Patented Mar. 1, 1870.

Witnesses:
Chas. H. Smith
Harold Serrell

D. Roberge

United States Patent Office.

DAVID ROBERGE, OF MOOERS FORKS, NEW YORK.

Letters Patent No. 100,329, dated March 1, 1870.

IMPROVEMENT IN HORSESHOES.

The Schedule referred to in these Letters Patent and making part of the same.

*To all whom it may concern:*

Be it known that I, DAVID ROBERGE, of Mooers Forks, in the county of Clinton, and State of New York, have invented and made a new and useful Improvement in Horseshoes; and I do hereby declare the following to be a full, clear, and exact description of the said invention, reference being had to the annexed drawing making part of this specification, wherein—

Similar marks of reference denote the same parts.

Figure 2:
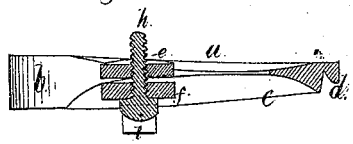
Figure 2 is a longitudinal section of the said shoe and clamp.

This shoe is intended especially for horses traveling on country roads, and upon smooth but not slippery pavements; and I make use of an adjustable calk and clamp to be applied to the horse's shoe, especially while in the stable, so as to produce a central bearing that enables the horse to stand in the most comfortable position for resting himself, or recuperating after excessive fatigue or any strain or over-exertion.

In the drawing—

$a$ is the horseshoe, that is made the thickest at the rear portions $b$. The sides of the shoe and front or toe portions are made concave, and so is the upper surface of the shoe, and it is also bent to a curve so that the toe portion of the shoe is the highest, (see fig. 2.)

The shoe is made with a ridge, $c$, around the toe and along the side portions of the shoe, said ridge forming a continuous calk, to prevent the horse slipping upon ordinary roadways or in the country, or upon rocks.

This ridge $c$ is the edge of the concave portion of the under side of the shoe, and $d$ is the flange or rim into which the nail-holes are introduced.

The shoe formed in this manner is very easy for the animal, as it rolls or rocks as the horse steps along, and there is no unnecessary leverage or strain upon the joints, tendons, or muscles.

The ridge or flange $c$ terminates in the thicker rear portion of the shoe. Calks might be applied at the rear ends of the shoe, but I prefer to dispense with them.

Horses frequently become fatigued in particular portions of the limbs, and sometimes they exert themselves too much, or overstrain themselves. The ordinary shoe does not give opportunity for the hoof to stand in any varying position, hence slight strains sometimes become permanent defects in consequence of the animal not being able to stand in the most comfortable position.

To remedy these difficulties I make use of a movable clamp and calk to form a central bearing for the hoof, the same being applied in the stable when the horse comes in, and taken off previous to his going out. However, this movable clamp and calk does not interfere with the walking of the horse, and might be worn when not in the stable.

Figure 3:
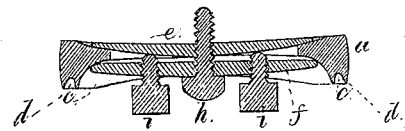
Figure 3 is a cross-section of the said shoe.
Figure 1:
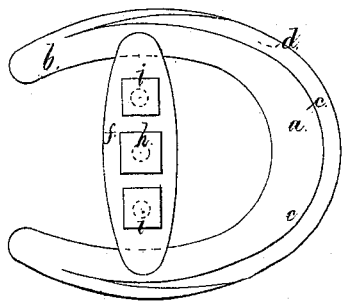
Figure 1 is an inverted plan of the shoe, which I term the double-concave rolling shoe, with the adjustable calk and clamp applied thereto.

The plate $e$ is made with thin ends, so as to be inserted within the edges of the shoe, between them and the hoof, as illustrated in fig. 3, and $f$ is a plate attached to the plate $e$ by a screw, $h$, so that these two plates may be clamped together and held securely at any place within the horseshoe where they may be placed.

$i\ i$ are screws forming calks. These may be one or more in number, or the head of the bolt $h$ might form the central calk.

It will now be understood that this clamp and calk can be applied under the central part of the hoof, and raise the same sufficiently to allow the hoof to stand in whatever position is the most comfortable for resting the animal while in the stable.

What I claim, and desire to secure by Letters Patent, is—

1. The double-concave horseshoe, formed with a bent upper surface and with the ridge $c$, as and for the purposes set forth.

2. The movable clamp and calk, formed substantially as set forth.

In witness whereof I have hereunto set my signature this 25th day of August, A. D. 1869.

D. ROBERGE.

Witnesses:
 CHAS. H. SMITH,
 HAROLD SERRELL.